(12) United States Patent
Hsieh

(10) Patent No.: US 10,557,759 B2
(45) Date of Patent: Feb. 11, 2020

(54) SENSOR ELEMENT AND ELECTRONIC DEVICE HAVING THE SAME

(71) Applicant: Au Optronics Corporation, Hsinchu (TW)

(72) Inventor: Wei-Jung Hsieh, Hsinchu (TW)

(73) Assignee: Au Optronics Corporation, Hsinchu (TW)

( * ) Notice: Subject to any disclaimer, the term of this patent is extended or adjusted under 35 U.S.C. 154(b) by 2 days.

(21) Appl. No.: 15/678,116

(22) Filed: Aug. 16, 2017

(65) Prior Publication Data

US 2018/0356304 A1   Dec. 13, 2018

(30) Foreign Application Priority Data

Jun. 13, 2017   (TW) .............................. 106119549 A

(51) Int. Cl.
| | |
|---|---|
| *H03K 17/965* | (2006.01) |
| *H03K 17/96* | (2006.01) |
| *G06F 1/16* | (2006.01) |
| *G01L 1/22* | (2006.01) |
| *G01L 1/26* | (2006.01) |
| *G06F 3/041* | (2006.01) |
| *G06F 3/045* | (2006.01) |

(52) U.S. Cl.
CPC .............. *G01L 1/2287* (2013.01); *G01L 1/26* (2013.01); *G06F 3/045* (2013.01); *G06F 3/0414* (2013.01)

(58) Field of Classification Search
CPC . G01L 1/2287; G01L 1/14; G01L 1/20; G01L 1/18; G01L 5/165; G01L 3/10; G01L 3/106; G01L 1/142; G01L 1/146; G01L 1/144; G06F 3/045; G06F 3/0414; G06F 2203/04105; G06F 3/0488; G06F 3/044; G06F 2203/04106; H03K 17/96
See application file for complete search history.

(56) References Cited

U.S. PATENT DOCUMENTS

| | | | | |
|---|---|---|---|---|
| 3,274,528 A | * | 9/1966 | Bermann | .............. G01L 1/2287 174/117 A |
| 4,175,429 A | * | 11/1979 | Keck | ..................... G01L 9/0002 73/862.68 |
| 4,744,252 A | * | 5/1988 | Stout | ....................... G01B 7/18 73/768 |

(Continued)

FOREIGN PATENT DOCUMENTS

| | | |
|---|---|---|
| CN | 101432677 | 5/2009 |
| CN | 102402389 | 4/2012 |

(Continued)

*Primary Examiner* — Brandi N Hopkins
(74) *Attorney, Agent, or Firm* — JCIPRNET

(57) ABSTRACT

A sensor element including a first supporting layer, a second supporting layer, and a strain gauge is provided. The first supporting layer has a first supporting surface. The second support layer has a second supporting surface. The second supporting layer is connected to the first supporting layer. The Young's modulus of the first supporting layer is greater than the Young's modulus of the second supporting layer. The strain gauge has a sensing area. The sensing area covers at least a portion of the first supporting surface and at least a portion of the second supporting surface. Furthermore, an electronic device including the sensor element is provided.

14 Claims, 7 Drawing Sheets

(56) References Cited

U.S. PATENT DOCUMENTS

| | | | | |
|---|---|---|---|---|
| 5,515,738 A * | 5/1996 | Tamori | ...................... | G01L 1/16 |
| | | | | 310/338 |
| 5,631,622 A * | 5/1997 | Hauber | ................. | G01L 1/2287 |
| | | | | 156/233 |
| 6,531,951 B2 * | 3/2003 | Serban | .................... | G01L 1/142 |
| | | | | 338/101 |
| 7,719,007 B2 * | 5/2010 | Tompkins | ............... | G01L 1/142 |
| | | | | 257/48 |
| 9,201,105 B2 * | 12/2015 | Iida | ......................... | G06F 3/044 |
| 2017/0176266 A1 * | 6/2017 | Mathieu | ............... | A61B 5/1036 |

FOREIGN PATENT DOCUMENTS

| | | |
|---|---|---|
| CN | 102591576 | 7/2012 |
| CN | 103701448 | 4/2014 |
| CN | 204652340 | 9/2015 |
| TW | I575420 | 3/2017 |

* cited by examiner

SENSOR ELEMENT AND ELECTRONIC DEVICE HAVING THE SAME

CROSS-REFERENCE TO RELATED APPLICATION

This application claims the priority benefit of Taiwan application serial no. 106119549, filed on Jun. 13, 2017. The entirety of the above-mentioned patent application is hereby incorporated by reference herein and made a part of this specification.

BACKGROUND OF THE INVENTION

Field of the Invention

The invention is related to a sensor element and an electronic device having the sensor element, and particularly to a sensor element which does not require an additional keycap and an electronic device having the sensor element.

Description of Related Art

For the past few years, technical products are mainly featured in mobility and functions. Therefore, electronic devices such as smart mobile phones, personal digital assistant (PDA), tablet PC or virtual reality (VR) devices become the main streams in the current market of electronic products.

In general, electronic devices are usually equipped with a button/buttons on a cover plate, and the cover plate is provided with a sensor element corresponding to the key(s). The key(s) and the sensor element are coupled to each other. A user can control the sensor element by pressing the key so as to control power, Bluetooth or switch of wireless network, or perform the function of adjusting volume, recording images or rolling and displaying pages. In general, the cover plate of the electronic device needs to be provided with a corresponding opening to install the key so that it is convenient for user to operate.

However, the above-mentioned configuration causes a waste of configuration space within the electronic device, and the assembling process is more complicated; therefore, there are problems such as high manufacturing difficulty, long manufacturing time and low assembling yield. On the other hand, dust and moisture can easily enter the inside of the electronic device via the seam between the key and the opening, causing that the function of the electronic element is affected and the service life thereof is reduced. Moreover, for conventional virtual keys, if the user needs to operate the key with gloves, it is required to wear special gloves with conducting functions. In addition, if the user performs the pressing action while driving or under the condition that the user cannot see the electronic device, it may not be convenient for the user to operate the electronic device due to that the feedback of virtual key is not preferable.

SUMMARY OF THE INVENTION

The invention provides a sensor element and an electronic device using the sensor element, which can simplify manufacturing process, reducing assembling time and decreasing manufacturing costs. The invention does not require an additional keycap, and the design of seamless key can be achieved. With such configuration, the appearance of electronic device can remain intact, and dust or moisture cannot easily enter the inside of the electronic device, thereby ensuring the service life and reliability of the electronic device.

The sensor element of the invention includes a first supporting layer, a second supporting layer and a strain gauge. The first supporting layer has a first supporting surface. The second supporting layer has a second supporting surface. The second supporting layer is connected to the first supporting layer. The Young's modulus of the first supporting layer is greater than the Young's modulus of the second supporting layer. The strain gauge has a sensing area. The sensing area covers at least a portion of the first supporting surface and at least a portion of the second supporting surface.

An electronic device of the invention includes a body, a cover plate and a sensor element. The cover plate includes a pressing portion, and the cover plate covers the body. The body includes a sensor element, and a sensor element is disposed in corresponding to the pressing portion of the cover plate. The sensor element includes a first supporting layer, a second supporting layer and a strain gauge. The first supporting layer has a first supporting surface. The second supporting layer has a second supporting surface. The second supporting layer is connected to the first supporting layer. The Young's modulus of the first supporting layer is greater than the Young's modulus of the second supporting layer. The strain gauge includes a sensing area. The sensing area covers at least a portion of the first supporting surface and at least a portion of the second supporting surface. The cover plate covers the first supporting layer, the second supporting layer and the strain gauge.

Based on the above, in the invention, by installing a sensor element in the inner side of the pressing portion of the cover plate, the user can press the pressing portion of the cover plate to realize the function of keys. In other words, in the invention, the function of keys can be realized without disposing an additional opening on the cover plate of the electronic device to accommodate a physical key or installing any other additional independent sensor element on the cover plate, thereby significantly simplifying manufacturing process, reducing assembling time, decreasing manufacturing costs and improving assembling yield. On the other hand, since the electronic device of the invention adopts design of seamless keys, there is no gap between the cover plate and the area where the function of key is realized; accordingly, not only that the appearance can remain intact, and the dust or moisture can also be prevented from entering the inside of the electronic device, thereby ensuring the service life and reliability of the electronic device.

In order to make the aforementioned features and advantages of the invention more comprehensible, embodiments accompanying figures are described in detail below.

DESCRIPTION OF EMBODIMENTS

Figure 1:
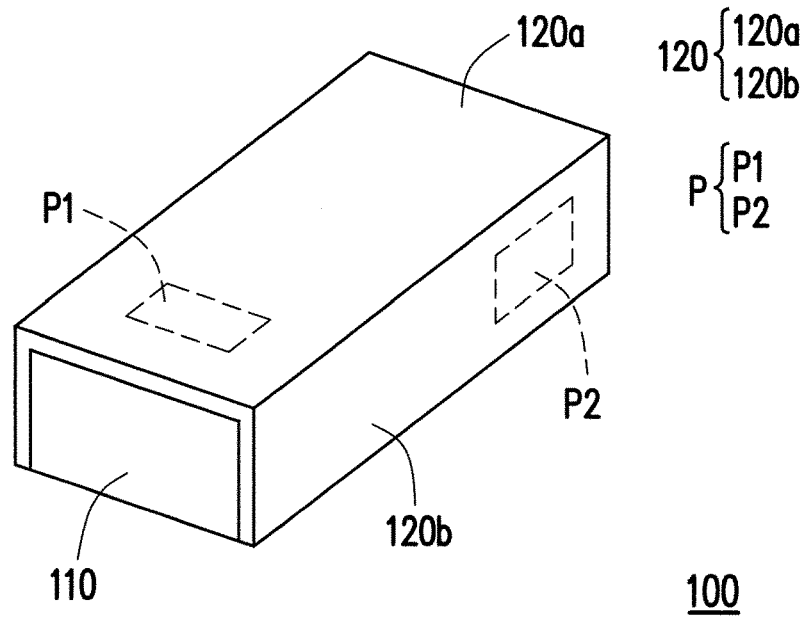
FIG. 1 is a perspective view of an electronic device according to one embodiment of the invention.
Figure 2:
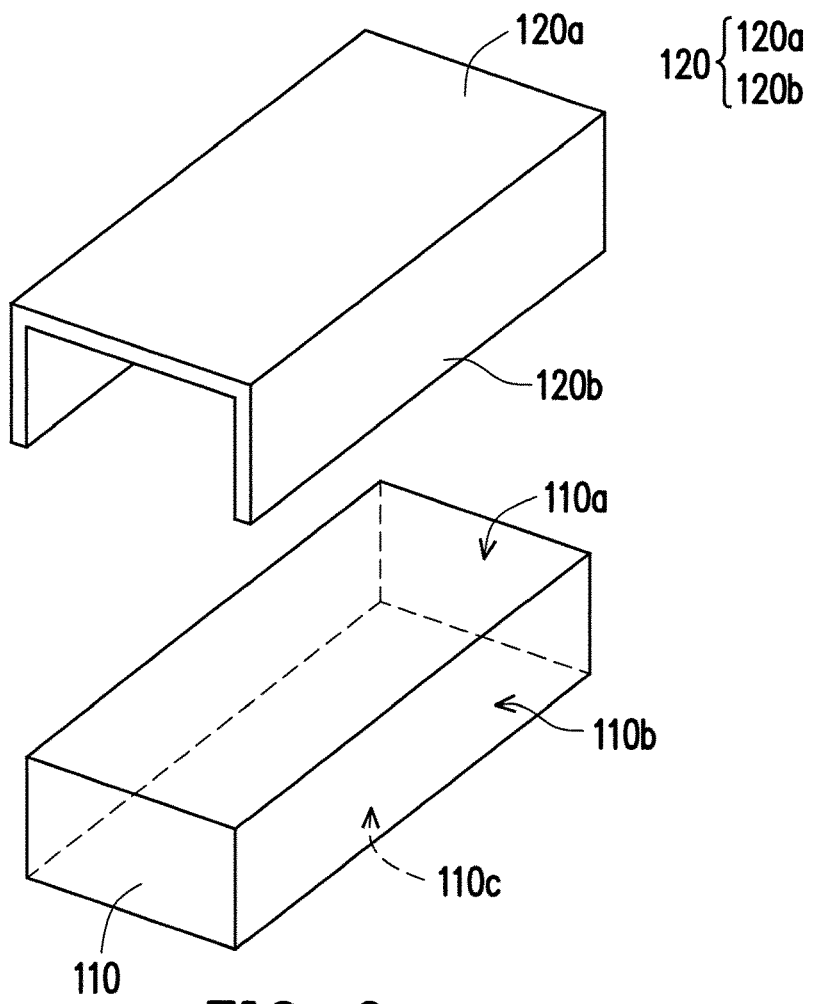
FIG. 2 is an explosive perspective view of the electronic device of FIG. 1.
Figure 3:
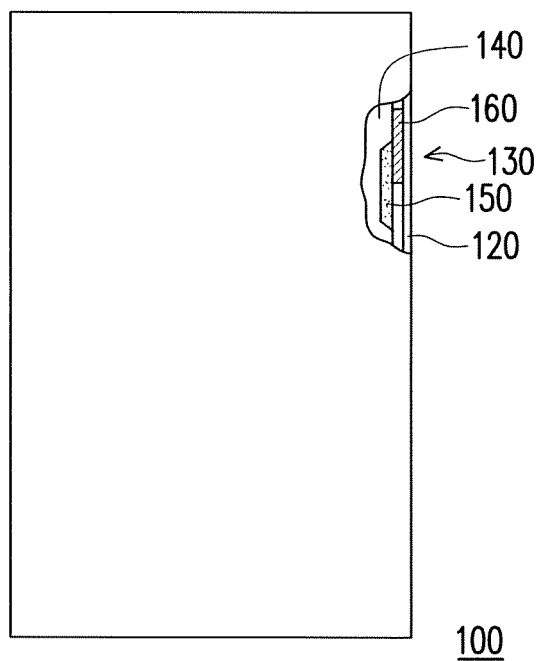
FIG. 3 is a top view of the electronic device of FIG. 1.

FIG. 1 is a perspective view of an electronic device according to one embodiment of the invention. FIG. 2 is an explosive perspective view of the electronic device of FIG. 1. FIG. 3 is a top view of the electronic device of FIG. 1. It should be pointed out that, for the purpose of clear illustration and descriptions, in FIG. 2, the contour of a body 110 in another direction of viewing angle is still illustrated in dashed lines to clearly show a position of a rear surface 110c of the body 110 or a corresponding relationship between the position of the rear surface 110c of the body 110 and a main display surface 110a and a sub-display surface 110b. Referring to FIGS. 1 to 3, in the embodiment, an electronic device 100 includes a body 110 and a cover plate 120. The electronic device 100 is, for example, a smart mobile phone, a PDA, a tablet PC or a virtual reality device including the body 110. The body 110 includes a sensor element 130, and may include a senor (not shown), a display (not shown), a processor (not shown), a power supplier (not shown), a vibrator (not shown), a controller (not shown) or other electronic units. The cover plate 120 is, for example, a plastic plate, a carbon fiber plate, a glass plate or a combination thereof; the invention provides no limitation thereto. In some embodiments, the material of the cover plate 120 may include a flexible material so that the electronic device 100 has a better texture.

The body 110 includes a main display surface 110a, a sub-display surface 110b which is connected to the main display surface 110a and a rear surface 110c opposite to the main display surface 110a. The sub-display surface 110b is not parallel with the main display surface 100a. The cover plate 120 is disposed on an outer side of the body 110 so as to cover the body 110. The cover plate 120 includes a first portion 120a and a second portion 120b. The first portion 120a is disposed on the main display surface 110a of the body 110. The second portion 120b is disposed on the sub-display surface 110b of the body 110. In the embodiment, the first portion 120a and the second portion 120b of the cover plate 120 can be connected to each other or formed in an integrated manner, which should not be construed as a limitation to the invention. In some embodiments, the first portion 120a and the second portion 120b of the cover plate 120 may also be separated from each other.

Figure 4:
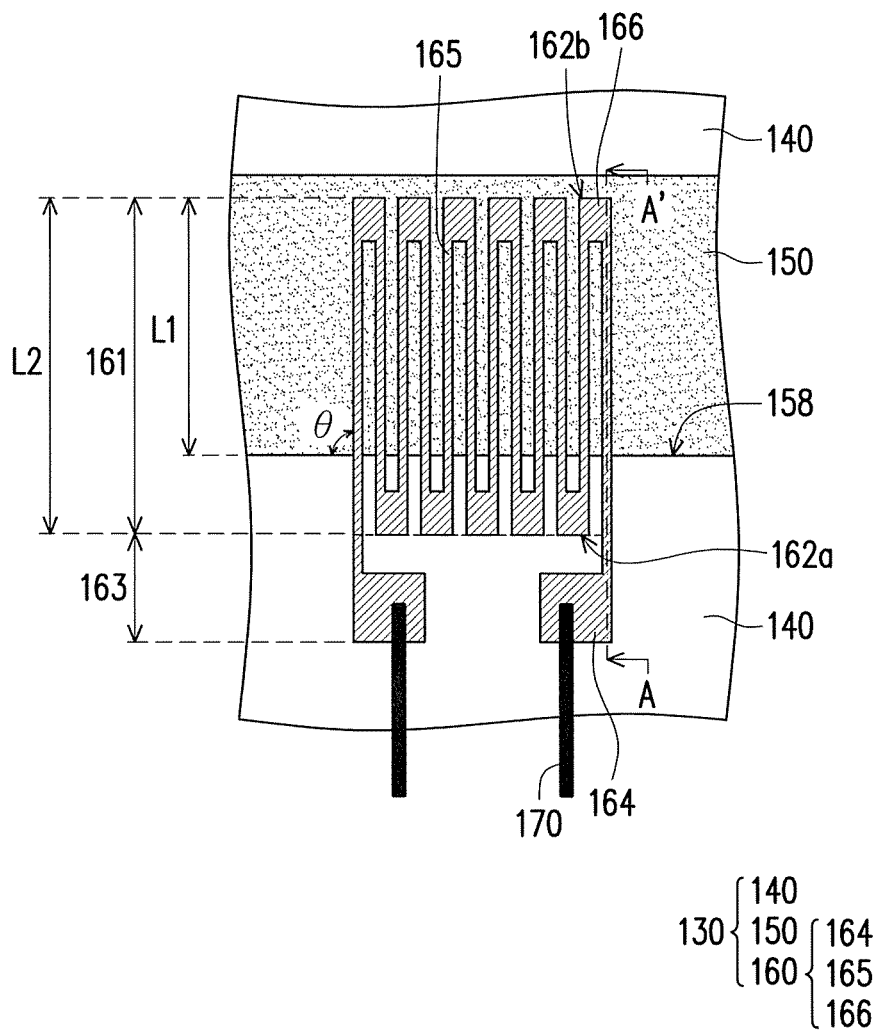
FIG. 4 is a top view of a sensor element.
Figure 5:
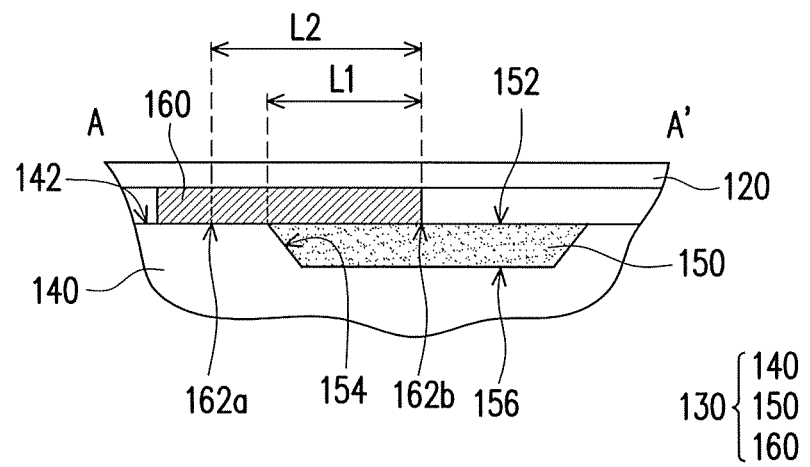
FIG. 5 is a sectional view of a sensor element of FIG. 4 along line A-A'.

FIG. 4 is a top view of a sensor element. FIG. 5 is a sectional view of the sensor element of FIG. 4 along line A-A'. Referring to FIGS. 1 to 5, in the embodiment, the cover plate 120 includes a pressing portion P. The number and position of the pressing portion P may be adjusted depending on needs. For example, in the embodiment, there may be two pressing portions P including a first pressing portion P1 and a second pressing portion P2, wherein the first pressing portion P1 is disposed on the first portion 120a of the cover plate 120, and the second pressing portion P2 is disposed on the second portion 120b of the cover plate 120. That is to say, the first pressing portion P1 is disposed on the main display surface 110a of the body 110, and the second pressing portion P2 is disposed on the sub-display surface 110b of the body 110. The sensor element 130 is disposed in corresponding to the pressing portion P of the cover plate 120, which should not be construed as a limitation to the invention. In other embodiments, the number of pressing portion P of the cover plate 120 and/or the sensor element 130 may be singular. For example, the electronic device 100 may include a plurality of sensor elements 130, and the sensor elements 130 may correspond to the same pressing portion P.

The sensor element 130 includes a first supporting layer 140, a second supporting layer 150 and a strain gauge 160. In the embodiment, the first supporting layer 140 may be a portion of the body 100. For example, the first supporting layer 140 may be a frame of the body 100, which should not be construed as a limitation to the invention. In other embodiments, the first supporting layer 140 may be embedded in a recess or cavity of the frame of the body 100. In the embodiment, the second supporting layer 150 may be embedded in a recess or cavity of the first supporting layer 140, which should not be construed as a limitation to the invention. In other embodiments, the second supporting layer 150 may be embedded in a recess or cavity of the frame of the body 100. It should be pointed out that, for the purpose of clear illustration and description, FIG. 3 only illustrates the sensor element 130 corresponding to the second pressing portion P2, and the sensor element (not shown) corresponding to the first pressing portion P1 may be similar to the sensor element 130.

The first supporting layer 140 has a first supporting surface 142. The second supporting layer 150 has a second supporting surface 152. The Young's modulus of the first supporting layer 140 is greater than the Young's modulus of the second supporting layer 150. In other words, as compared with the first supporting layer 140, after being subjected to the force, the second supporting layer 150 has a larger degree of plastic deformation. In the embodiment, the material of the first supporting layer 140 may be glass, plastic, rubber, silicone, or other suitable insulating material. The second supporting layer 150 has a property of being compressible, and the material thereof includes, for example, rubber, silicone or other insulating resilient material. Specifically, the second supporting layer 150 having elasticity can be correspondingly compressed after being subjected to an external force (see FIG. 6). After the external force disappears, the second supporting layer 150 can restore to the original status when the external force is not applied (see FIG. 5).

In terms of the manufacturing process, a recess may be formed on the first supporting layer 140 first via laser drilling, mechanical drilling or an etching process, wherein the recess extends inward from the first supporting surface 142 of the first supporting layer 140. In the embodiment, a side wall of the recess is inclined, and the bottom portion of the recess is a plane surface. Subsequently, a coating method, a bonding method, a sol-gel method or a lamination method is applied to fill the raw material of the resilient material in the recess of the first supporting layer 140. Then a photopolymerization or a baking process is carried out depending on the property of the raw material to cure the raw material into the second supporting layer 150. Accordingly, the second supporting layer 150 is formed to cover the side wall of the recess so as to form an interface 154 where the first supporting layer 140 and the second supporting layer 150 contact each other. In addition, a bottom surface 156 of the second supporting layer 150 may be a plane surface corresponding to a bottom surface of the recess, and the second supporting layer 150 has a second supporting surface 152 opposite to the bottom surface 156.

In some embodiments, the first supporting surface 142 of the first supporting layer 140 and the second supporting surface 152 of the second supporting layer 150 conformally form a continual surface; that is, there is no significant step at the interface between the first supporting surface 142 and the second supporting surface 152. As shown in FIG. 5, the second supporting layer 150 may be in a trapezoid shape in the sectional view; with such configuration, the strain gauge 160 of the sensor element 130 can be disposed on the plane formed by the first supporting surface 142 and the second supporting surface 152.

In some embodiments, the second supporting layer 150 may also be an airbag or a bladder formed by compressible gas or liquid covered by insulating material.

As shown in FIG. 4, the strain gauge 160 has a sensing area 161 and a connecting area 163 which outputs a signal. The connecting area 163 of the strain gauge 160 covers a portion of the first supporting surface 142, and the sensing area 161 of the strain gauge 160 covers a portion of the first supporting surface 142 and a portion of the second supporting surface 152. The strain gauge 160 includes connecting pads 164, a plurality of bar lines 165 and a plurality of connecting lines 166. The connecting pads 164 is disposed in the connecting area 163, and the bar lines 165 and the connecting lines 166 are disposed in the sensing area 161. The strain gauge 160 may be electrically connected to other elements via a lead 170, a conductive hole or other electrically connecting elements on the connecting pads 164. The bar lines 165 are parallel with each other, and serially connected with a corresponding adjacent bar line 165 via the connecting line 166 to form an S-shaped circuit (e.g., a meander line). Two bar lines 165 on the outer side disposed on an end of the first supporting surface 142 is connected to the connecting pads 164. In the embodiment, the sensing area 161 of the strain gauge 160 overlaps the bottom surface 156 of the second supporting surface 152, which should not be construed as a limitation to the invention.

In the embodiment, a boundary line 158 is formed between the first supporting surface 142 and the second supporting surface 152. An included angle θ is formed between an extending direction of the bar line 165 and the boundary line 158; the angle of included angle θ is larger than 0. In other words, the sensing area 161 covers the second supporting surface 152 of the second supporting layer 150 and the first supporting surface 142 of the first supporting layer 140 simultaneously. Apart from that, the sensing area 161 of the strain gauge 160 has a first end 162a and a second end 162b opposite to each other, wherein the first end 162a is disposed on the first supporting surface 142, and the second end 162b is disposed on the second supporting surface 152. A distance L1 is formed between the second end 162b and the boundary line 158. A second distance L2 is formed between the first end 162a and the second end 162b. A ratio of the first distance L1 to the second distance L2 is larger than or equal to 0.05 and smaller than or equal to 0.95 (i.e. 0.05≤(L1/L2)≤0.95). That is to say, the sensing area 161 covers a portion of the first supporting surface 142 and a portion of the second supporting surface 152. With such configuration, the external force (as shown in FIG. 6) applied to the pressing portion P of the cover plate 120 can make the strain gauge 160 disposed in corresponding to the pressing portion P to correspondingly generate a partial deformation on the second supporting surface 152.

In the embodiment, an interface 154 is formed between the first supporting layer 140 and the second supporting layer 150, and the interface 154 is not perpendicular to the first supporting surface 142 and/or the second supporting surface 152. As a result, the second supporting layer 150 disposed on the interface 154 can have a different thickness, and the thickness of the second supporting layer 150 on the interface 154 gradually increases in a direction away from the boundary line 158. With such configuration, the corresponding deformation generated by the strain gauge 160 disposed on the interface 154 after being subjected to force can gradually increase from the boundary line 158 to a place away from the boundary line 158, so as to reduce the possibilities that the part of the strain gauge 160 at the boundary line 158 is broken due to metal fatigue caused by a plurality times of partial dramatic deformation. In addition, since the interface 154 is not perpendicular to the first supporting surface 142 and/or the second supporting surface 152, the thickness of the second supporting layer 150 on the interface 154 gradually increases in a direction away from the boundary line 158. Therefore, even if the pressing portion P of the cover plate 120 is subjected to uniformed force, the deformation generated at the second end 162b of the strain gauge 160 disposed in corresponding to the pressing portion P is greater than the deformation generated at the first end 162a.

Figure 6:
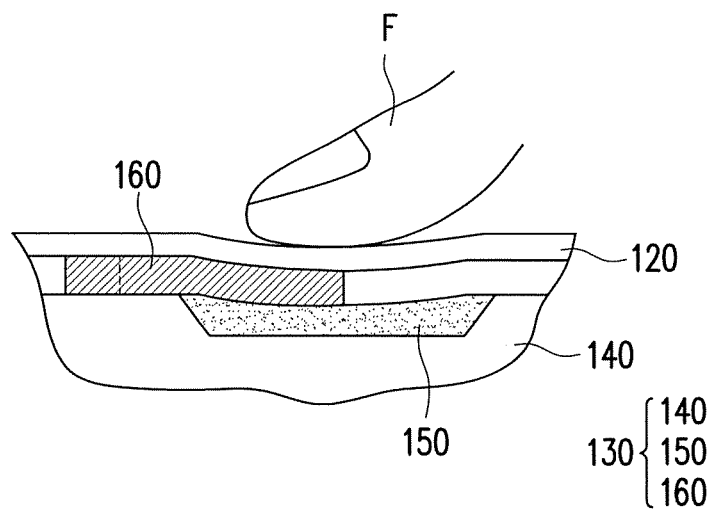
FIG. 6 is a sectional view of actuation of the sensor element of FIG. 5.

FIG. 6 is a sectional view of actuation of the sensor element 130 of FIG. 5. Referring to FIGS. 1 to 6 at the same time, when a user or other devices apply external force to the pressing portion P of the cover plate 120, the sensor element 130 is deformed via the cover plate 120. For example, when the user applies the external force to the pressing portion P via a finger F or other means, the cover plate 120 generates partial deformation toward the sensor element 130, so that the sensor element 130 which abuts the cover plate 120 generates corresponding deformation. In the condition that the sensor element 130 is subjected to force and generates deformation, since the Young's modulus of the second supporting layer 150 is smaller than the Young's modulus of the first supporting layer 140, the second supporting layer 150 is correspondingly compressed so that the strain gauge 160 disposed between the second supporting layer 150 and the cover plate 120 is deformed into a stretching status; therefore, the circuit on the strain gauge 160 becomes long and narrow, which causes the strain gauge 160 to generate electrical change. In the embodiment, the strain gauge 160 may be electrically connected to a sensor; the sensor may determine the level or period of the deformation according to the corresponding resistance signal value of the strain gauge 160.

In some embodiments, the strain gauge 160 of the sensor element 130, other plurality of resistance elements (not shown) and power supplier (not shown) may be connected in series and parallel to form a Wheatstone bridge circuit. The other resistance elements may be a fixed resistor or a variable resistor, which should not be construed as a limitation to the invention. With such design of circuit, under the different conditions that the sensor elements 130 is subjected to force, the Wheatstone bridge circuit can have different output signals. Accordingly, different signal forms can be deduced according to algorithm so that the electronic device 100 having the sensor element 130 can have different function properties.

It should be indicated that the following embodiments in FIGS. 7 to 11 use the reference numerals and a portion of the content recited in the embodiments of FIGS. 1 to 6, wherein the same or similar reference numerals are used to represent the same or similar elements. Meanwhile, identical technical content is omitted. Please refer to the previous embodiments for the omitted descriptions; no repetition is incorporated in the following embodiments.

Figure 7:
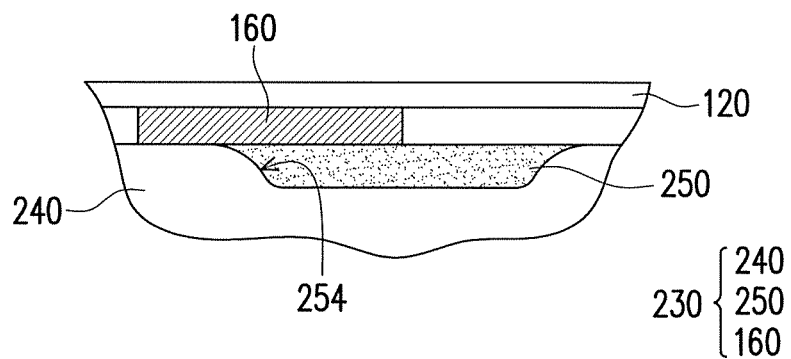
FIG. 7 is a sectional view of a sensor element according to another embodiment of the invention.

FIG. 7 is a sectional view of a sensor element according to another embodiment of the invention. Referring to FIG. 7, a sensor element 230 of the embodiment is similar to the sensor element 130 in the previous embodiment; the difference between them lies in that an interface 154 between a first supporting layer 240 and a second supporting layer 250 is an arc-shaped surface, and a random tangent plane of the interface 251 is not perpendicular to the first supporting surface 242 and/or a second supporting surface 252. Accordingly, after the strain gauge 160 is subjected to external force, the possibility that the strain gauge 160 is fractured due to concentrated stress can be decreased.

Figure 8:
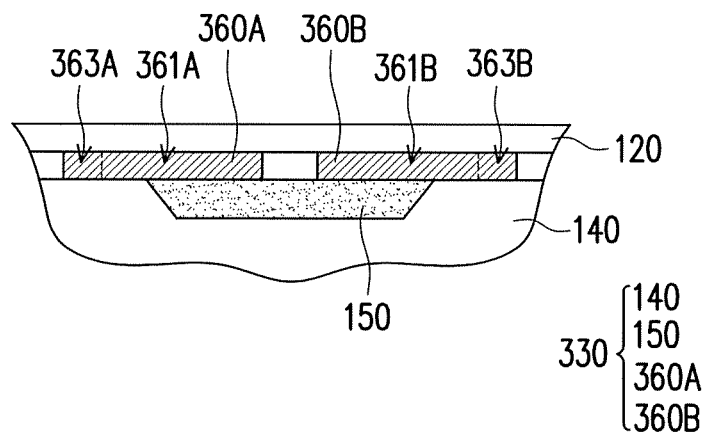
FIG. 8 is sectional view of a sensor element according to yet another embodiment of the invention.

FIG. 8 is a sectional view of a sensor element according to yet another embodiment of the invention. Referring to FIG. 8, a sensor element 330 of the embodiment is similar to the sensor element 130 of the previous embodiments; the difference between them lies in that the sensor element 330 includes a plurality of strain gauges 360A and 360B. In the embodiment, the number of the strain gauges 360A and 360B is set as two as an example, which should not be construed as a limitation to the invention. Specifically, in the embodiment, the sensor element 330 includes a first strain gauge 360A and a second strain gauge 360B. The first strain gauge 360A has a first sensing area 361A and a first connecting area 363A connected to the first sensing area 361A. The first connecting area 363A of the first strain gauge 360A covers a portion of the first supporting surface 142, and the first sensing area 361A of the first strain gauge 360A covers a portion of the first supporting surface 142 and a portion of the second supporting surface 152. The second strain gauge 360B has a second sensing area 361B and a second connecting area 363B connected to the second sensing area 361B. The second connecting area 363B of the second strain gauge 360B covers a portion of the first supporting surface 142, and the second sensing area 361B of the second strain gauge 360B covers a portion of the first supporting surface 142 and a portion of the second supporting surface 152. The cover plate 120 covers the first supporting layer 140, the second supporting layer 150, the first strain gauge 360A and the second strain gauge 360B. The first strain gauge 360A and/or the second strain gauge 360B may be similar to the strain gauge 160 as described in the previous embodiments; no repetition is incorporated herein.

In some embodiments, the first strain gauge 360A and the second strain gauge 360B are electrically isolated from each other; the first strain gauge 360A and the second strain gauge 360B may be electrically connected to different electronic elements and/or sensors respectively so that the first strain gauge 360A and the second strain gauge 360B can have different functions, and that the sensor element 330 having the first strain gauge 360A and the second strain gauge 360B can be a multi-functional sensor element 330.

In some embodiments, the first strain gauge 360A and the second strain gauge 360B are electrically connected to each other. Moreover, the first strain gauge 360A, the second strain gauge 360B, other plurality of resistance elements (not shown) and voltage source (not shown) can be connected in series and parallel to form a Wheatstone bridge circuit so that the electronic device having the sensor element 330 can have different functional properties.

Figure 9:
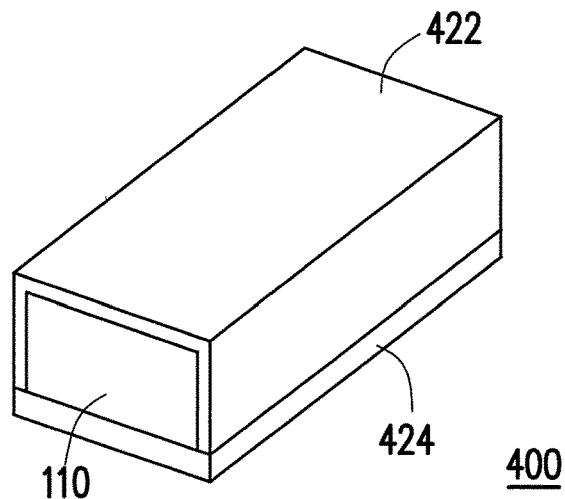
FIG. 9 is a perspective view of an electronic device according to still another embodiment of the invention.
Figure 10:
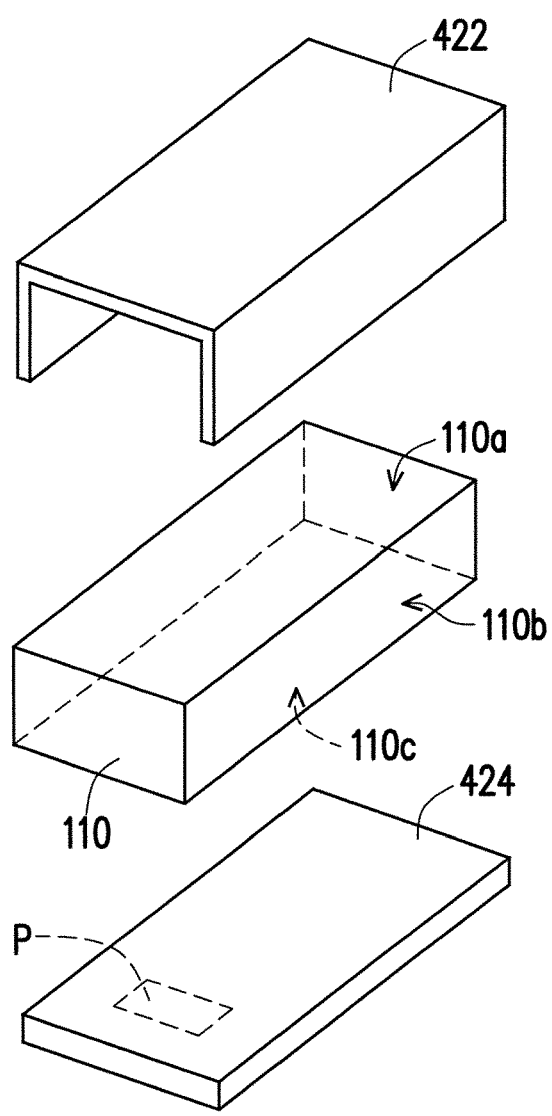
FIG. 10 is an explosive perspective view of the electronic device of FIG. 9.

FIG. 9 is a perspective view of an electronic device according to still another embodiment of the invention. FIG. 10 is an explosive perspective view of the electronic device of FIG. 9. It should be pointed out that, for the purpose of clear illustration and descriptions, in FIG. 10, the contour of body 110 in another direction of viewing angle is still illustrated in dashed lines so as to clearly show the position of the rear surface 110c of the body 110 or a corresponding relationship between the position of the rear surface 110c of the body 110 and the main display surface 110a and the sub-display surface 110b. Referring to FIGS. 9 and 10, an electronic device 400 in the embodiment is similar to the electronic device 100 in FIGS. 1 to 3; the difference between them is that the electronic device 400 includes the body 110, a first cover plate 422 and a second cover plate 424. The first cover plate 422 covers the main display surface 110a and sub-display surface 110b of the body 110. The second cover plate 424 covers the rear surface 110c of the body 110, and the second cover plate 424 has the pressing portion P. The body 110 includes the sensor element 130. The sensor element 130 is disposed in corresponding to the pressing portion P of the second cover plate 424, and the first supporting surface 142 of the sensor element 130 is coplanar with the rear surface 110c of the body 110.

In the embodiment, the first cover plate 422 and the second cover plate 424 may be separated from each other, which should not be construed as a limitation to the invention. In some embodiments, the first cover plate 422 and the second cover plate 424 may be connected to each other or formed in an integrated manner.

Figure 11:
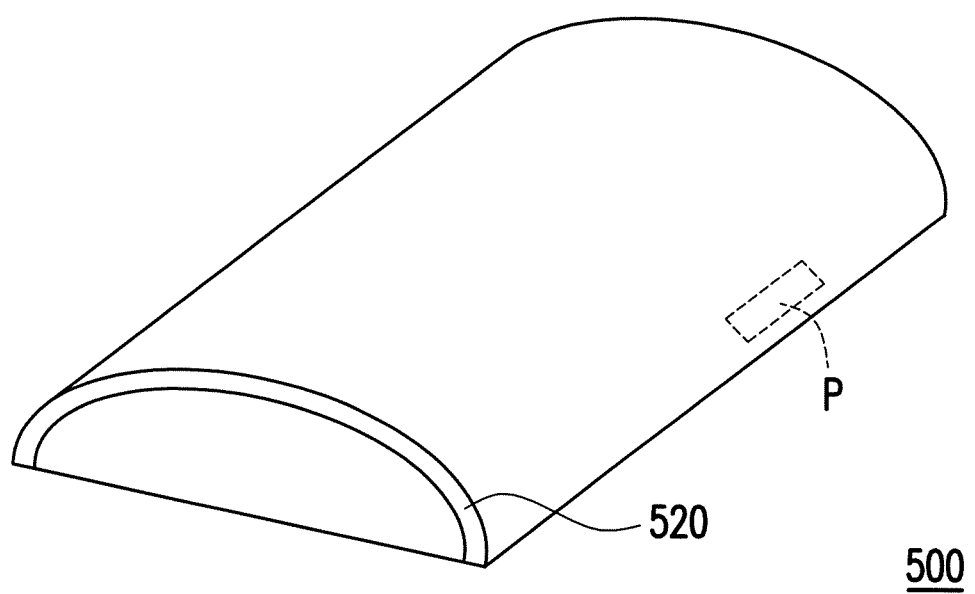
FIG. 11 is a perspective view of an electronic device according to yet another embodiment of the invention.

FIG. 11 is a perspective view of an electronic device according to yet another embodiment of the invention. Referring to FIG. 11, an electronic device 500 of the embodiment is similar to the electronic device 100 of the embodiments of FIGS. 1 to 3; the difference between them is that a cover plate 520 of the electronic device 500 has an arc-shaped surface.

In summary of the above, in the invention, by installing the sensor element in the inner side of the pressing portion of the cover plate, the user can press the pressing portion of the cover plate to realize the function of keys. That is to say, in the invention, the function of keys can be realized without configuring an additional opening on the cover plate of the electronic device to accommodate a physical key or installing any other additional independent sensor element on the cover plate, thereby significantly simplifying manufacturing process, reducing assembling time, decreasing manufacturing costs and improving assembling yield. On the other hand, since the electronic device of the invention adopts design of seamless keys, there is no gap between the cover plate and the area where the function of key is realized; therefore, not only that the appearance can remain intact, the sense of touch while performing pressing action under blind-touch conditions can be improved, and it can also be avoided that the dust or moisture enters the interior of the electronic device, thereby ensuring the service life and reliability of the electronic device.

Although the invention has been disclosed by the above embodiments, the embodiments are not intended to limit the invention. It will be apparent to those skilled in the art that various modifications and variations can be made to the structure of the invention without departing from the scope or spirit of the invention. Therefore, the protecting range of the invention falls in the appended claims.

What is claimed is:

1. A sensor element, comprising:
   a first supporting layer, comprising a first supporting surface;
   a second supporting layer, comprising a second supporting surface, the second supporting layer connected to the first supporting layer, wherein a Young's modulus of the first supporting layer is greater than a Young's modulus of the second supporting layer; and a strain gauge, comprising a sensing area, the sensing area covering at least a portion of the first supporting surface and at least a portion of the second supporting surface, wherein the sensing area of the strain gauge comprises a first end and a second end opposite to the first end, and a boundary line is formed between the first supporting surface and the second supporting surface and locates between the first end and the second end, wherein a junction of the first supporting layer and the second supporting layer conformally forms a continual surface, wherein the first supporting layer and the second supporting layer are located on a same side of the continual surface, the strain gauge and the first supporting layer are located on opposite sides of the continual surface, and the strain gauge and the second supporting layer are located on the opposite sides of the continual surface.

2. The sensor element according to claim 1, wherein the first supporting surface is coplanar with the second supporting surface.

3. The sensor element according to claim 1, wherein the strain gauge comprises a plurality of bar lines and a plurality of connecting lines, wherein the bar lines and the connecting lines are disposed in the sensing area, the bar lines are parallel with each other, and the bar lines are connected to each other in series via the connecting lines to form an S-shaped circuit.

4. The sensor element according to claim 3, wherein a boundary line is formed between the first supporting surface and the second supporting surface, an included angle is formed between an extending direction of the bar lines and the boundary line, and an angle of the included angle is larger than 0.

5. The sensor element according to claim 1, wherein a distance between the second end and the boundary line is L1, a distance between the first end and the second end is L2, and $0.05 \leq (L1/L2) \leq 0.95$.

6. The sensor element according to claim 1, wherein an interface is formed between the first supporting layer and the second supporting layer, and the interface is not perpendicular to the first supporting surface.

7. The sensor element according to claim 1, wherein an interface is formed between the first supporting layer and the second supporting layer, and the interface is an arc-shaped surface.

8. The sensor element according to claim 1, wherein the strain gauge generates different resistance signal values when having different strain states.

9. An electronic device, comprising:
a cover plate, comprising a pressing portion; and
a body covered by the cover plate, and the body comprising a sensor element disposed corresponding to the pressing portion of the cover plate, wherein the sensor element comprises:
a first supporting layer, comprising a first supporting surface;
a second supporting layer, comprising a second supporting surface, the second supporting layer connected to the first supporting layer, wherein a Young's modulus of the first supporting layer is greater than a Young's modulus of the second supporting layer; and
a first strain gauge, comprising a first sensing area, the first sensing area covering at least a portion of the first supporting surface and at least a portion of the second supporting surface, and the cover plate covering the first supporting layer, the second supporting layer and the first strain gauge, wherein the first sensing area of the first strain gauge comprises a first end and a second end opposite to the first end, and a boundary line is formed between the first supporting surface and the second supporting surface and locates between the first end and the second end, wherein a junction of the first supporting layer and the second supporting layer conformally forms a continual surface, wherein the first supporting layer and the second supporting layer are located on a same side of the continual surface, the first strain gauge and the first supporting layer are located on opposite sides of the continual surface, and the first strain gauge and the second supporting layer are located on the opposite sides of the continual surface.

10. The electronic device according to claim 9, wherein the sensor element further comprises: a second strain gauge, having a second sensing area, wherein the second sensing area covers at least a portion of the first supporting surface and at least a portion of the second supporting surface, and the cover plate further covers the second strain gauge.

11. The electronic device according to claim 10, wherein the first supporting surface surrounds the second supporting surface, and the second strain gauge is disposed on two opposite ends of the second supporting surface.

12. The electronic device according to claim 9, wherein the first supporting surface of the sensor element is coplanar with a main display surface of the body.

13. The electronic device according to claim 9, wherein the first supporting surface of the sensor element is coplanar with a sub-display surface of the body, wherein the sub-display surface is connected with a main display surface of the body, and wherein the sub-display surface is not parallel with the main display surface.

14. The electronic device according to claim 9, wherein the first supporting surface of the sensor element is coplanar with a rear surface of the body, and wherein a main display surface of the body is opposite to the rear surface.

* * * * *